2,995,559
N-PARAMINO ALKOXY PHENYL-AROMATIC
DICARBOXYLIC ACID IMIDES
Heinrich Ruschig, Bad Soden (Taunus), and Karl Schmitt and Ernst Lindner, Frankfurt am Main, Germany, assignors to Farbwerke Hoechst Aktiengesellschaft vormals Meister Lucius & Bruning, Frankfurt am Main, Germany, a corporation of Germany
No Drawing. Filed Dec. 15, 1958, Ser. No. 780,203
Claims priority, application Germany Dec. 21, 1957
6 Claims. (Cl. 260—294)

The present invention relates to aromatic dicarboxylic acid imides and to a process for their manufacture.

It has been found that aromatic dicarboxylic acid imides of the general formula

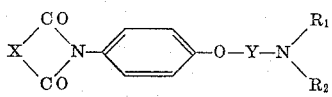

wherein X represents a bivalent aromatic radical which can be substituted by a halogen atom, Y represents an alkylene group containing at most 4 carbon atoms, $R_1$ and $R_2$ are alkyl-, aralkyl- or cycloalkyl groups, the alkyl groups being of low molecular weight, or together with the nitrogen atom represent the residue of a saturated 5- or 6-membered ring system, one of the radicals $R_1$ and $R_2$ may likewise represent a hydrogen atom, and their salts, which are characterized by valuable analgesic and antiphlogistic properties can be obtained by reacting basically substituted alkyl ethers of p-aminophenol of the general formula

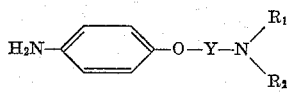

in which Y and $R_2$ have the meanings given above with aromatic dicarboxylic acids whose aromatic radical may likewise be substituted by halogen atoms or with their reactive derivatives, and, by converting in the usual manner carbonamide acid derivatives which may have been formed by ring closure into the corresponding dicarboxylic acid imide derivatives.

The product obtained according to the process of the present invention can be characterized by the following general Formula I but an asymmetric constitution according to Formula II can likewise be taken into consideration for such compounds (compare Angewandte Chemie 40 (1927), page 71).

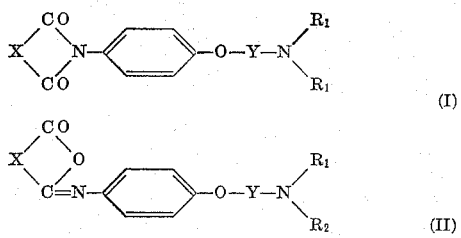

In the formulae X stands for a bivalent aromatic radical which can also be substituted by halogen, preferably chlorine and bromine; Y represents an alkylene group with at most 4 carbon atoms—the alkylene groups can be straight-chained or branched—whereas $R_1$ and $R_2$ are identical or different alkyl, cycloalkyl or aralkyl groups—the alkyl groups being of low molecular weight —or together with the nitrogen atom represent the radical of a 5- or 6-membered ring system. One of the radicals $R_1$ or $R_2$ may also stand for a hydrogen atom.

As aromatic dicarboxylic acids or derivatives thereof which are suitable for the reaction with the basically substituted alkyl ethers of the para-aminophenol there are mentioned, for instance: phthalic acid, 3-chloro-phthalic acid, 4-chloro-phthalic acid, naphthalene-1,8-dicarboxylic acid, diphenyl-2,2'-dicarboxylic acid as well as anhydrides, esters, halides, amides, imides or sulfides of such dicarboxylic acids.

As basically substituted alkyl ethers of the p-aminophenol which can be used according to the process of the invention for the reaction with aromatic dicarboxylic acids or their derivatives there may be mentioned, for instance:

1-(para-aminophenoxy)-2-dimethylamino-ethane
1-(para-aminophenoxy)-2-diethylamino-ethane
1-(para-aminophenoxy)-2-diisopropylaminoethane
1-(para-amino-phenoxy)-2-butylamine-ethane
1-(para-amino-phenoxy)-2-dibutylamino-ethane
1-(para-amino-phenoxy)-2-sec. butylamino-ethane
1-(para-amino-phenoxy)-2-(di-sec. butylamino)-ethane
1-(para-amino-phenoxy)-2-diisobutylamino-ethane
1-(para-amino-phenoxy)-2-dimethylaminopropane
1-(para-amino-phenoxy)-2-cyclohexylamino-ethane
1-(para-amino-phenoxy)-2-(methyl-cyclohexylamino)-ethane
1-(para-amino-phenoxy)-2-dicyclohexylamino-ethane
1-(para-amino-phenoxy)-2-(methyl-benzylamino)-ethane
1-(para-amino-phenoxy)-2-(methyl-β-phenylethyl-amino)-ethane
1-(para-amino-phenoxy)-2-[sec. butyl-(para-aminophenylethyl)-amino]-propane
1-(para-amino-phenoxy)-2-pyrrolidino-ethane
1-(para-amino-phenoxy)-2-piperidino-ethane
1-(para-amino-phenoxy)-2-(2-methylpiperidino)-ethane
1-(para-amino-phenoxy)-2-(4-benzylpiperidino)-ethane
1-(para-amino-phenoxy)-2-piperidino-propane
2-(para-amino-phenoxy)-2-piperidino-propane
1-(para-amino-phenoxy)-1-morpholino-ethane
1-(para-amino-phenoxy)-2-morpholino-propane
1-(para-amino-phenoxy)-3-piperidino-propane
1-(para-amino-phenoxy)-4-piperidino-butane The reaction of the aromatic dicarboxylic acids which may be substituted by halogen or of their reactive derivatives with the basically substituted alkyl ethers of para-aminophenol is carried out according to methods known in principle. Acid anhydrides are favourably used which on heating to temperatures generally above 100° C. together with the aniline derivative are transformed into the corresponding dicarboxylic acid imides while splitting off water. It is of particular advantage to carry out the process in such a way that the components are heated at the water separator in a solvent immiscible with water, for example benzene, toluene or xylene until the calculated amount of water has been completely separated. The dicarboxylic acid imide which usually crystallizes on cooling is obtained in good yield from the reaction mixture. Another favorable method of operation is the reaction of the components in boiling glacial acetic acid. For this purpose the basic aniline derivative can likewise be used in the form of a mono- or di-salt, for example in the form of hydrochloride so that as reaction product the corresponding salt is directly obtained. It is, however, likewise possible primarily to let the components react in a solvent such as alcohol, acetone, dioxane, dimethyl-formamide and the like at a temperature below 100° C. in order to form the corresponding carbonamide acid and then to close the imide ring for instance by heating, treatment with a hydrohalic acid or boiling with glacial acetic acid. The products obtained by the process as far as they are obtained in the form of free bases according to the process of the present invention can be transformed into the corresponding salts by means of organic or inorganic acids. As organic acids there are mentioned, for example, acetic acid, malonic acid, propionic acid, lactic acid, succinic acid, tartaric acid, maleic acid, fumaric acid, citric acid, malic acid, benzoic acid, salicylic acid, hydroxy-ethane-sulfonic acid, aceturic acid, ethylene-diamine-tetra-acetic acid. As inorganic acids there enter into consideraton, for instance: hydrohalic acids, such as hydrochloric acid and hydrobromic acid, sulfuric acid, phosphoric acid and amido-sulfonic acid.

The compounds obtained according to the process of the present invention are valuable medicaments characterized, for instance, by antiphlogistic properties, especially by their surprisingly good analgesic properties. For example, the 1-(para-phthalimido-phenoxy)-2-piperidino-ethane-hydrochloride exhibits two or three times the analgesic efficiency of dimethylamino-phenyl-dimethyl-pyrazolone. When determining the analgesic effect in the mouse according to the method of Wolff, Hardy, Goodell [compare J. of Chimic. Investigation, volume 19, pages 649 and 659 (1940) and volume 20, page 63 (1941)] by means of a dose of 30 milligrams/kilogram subcutaneously injected, a considerable increase of the reaction period is observed, whereas a dosage of 40 milligrams/kilogram subcutaneously injected results in a complete insensitiveness. The compound likewise shows an excellent analgesic efficacy on oral administration. For instance, 60 milligrams/kilogram orally administered cause a considerable analgesic effect within 30 minutes and this effect extensively diminishes only after three hours. An antiphlogistic effect can be already observed in the rat with a dosage of 40 milligrams/kilogram.

The compounds can be used as such, or in certain cases more favorably in the form of their salts, if desired they can be worked up to pharmaceutical preparations with admixture of pharmaceutically suitable carrier substances, such as starch, lactose, tragecanth, magnesium stearate and the like. They can thus be administered in the form of tablets, dragees, capsules, drops, suppositories, ampoules. The preparations are preferably administered per os.

The following examples serve to illustrate the invention but they are not intended to limit it thereto.

Example 1

110 grams of 1-(para-amino-phenoxy)-2-piperidino-ethane and 74 grams of phthalic acid anhydride are boiled under reflux in 1 litre of xylene at the water separator until the separation of water is finished. From the reaction mixture there are obtained, after cooling in ice, 160 grams (about 90% of the theoretical yield) of 1-(para-phthalimidophenoxy)-2-piperidino-ethane in the form of colorless crystals which after recrystallization from alcohol melt at 138–140° C.

| | Degrees C. |
|---|---|
| Melting point of the hydrochloride | 255–257 |
| Melting point of the acid phthalate | 158–159 |
| Melting point of the salicylate | 154–156 |

From the aqueous solution of the hydrochloride there is obtained after treatment with bases a yellow base which after recrystallization from alcohol melts at 140° C. and which, with the original colorless base, does not cause a depression of the melting point. The base which at the beginning shows a yellow color can be decolorized by drying it in the high vacuum at about 80° C. or by trituration with ether or pyridine. In a reverse manner the yellow base can be obtained from the colourless base by recrystallization and while using yellow inoculation germs. The ultraviolet absorption of both bases in alcohol, carbon tetrachloride and cyclohexane is identical.

In an analogous maner there is obtained from 4-chloro-phthalic acid anhydride and 1-(para-amino-phenoxy)-2-piperidino-ethane the 1-[para-(4-chloro-phthalimido)-phenoxy]-2-piperidino-ethane melting at 133–135° C.

In an analogous maner there is obtained from 1-(para-amino-phenoxy)-2-morpholino-ethane and phthalic acid anhydride the 1-(para-phthalimido-phenoxy)-2-morpholino-ethane which forms a hydrochloride melting at 253–256° C. In an analogous manner there is obtained from 1-(para-amino-phenoxy)-2-(2'-methyl-piperidino)-ethane and phthalic acid anhydride the 1-(para-phthalimido-phenoxy)-2-(2'-methyl-piperidino)-ethane whose hydrochloride melts at 233–235° C.

Example 2

By heating equimolecular amounts of phthalic acid anhydride and 1-(para-amino-phenoxy)-2-piperidino-propane in xylene until the separation of water is terminated and acidification of the reaction solution by means of methanolic hydrochloric acid the hydrochloride of 1-(para-phthalimido-phenoxy)-2-piperidino-propane is obtained melting at 237–239° C.

Example 3

A mixture of 20.6 grams of 1-(para-amino-phenoxy)-2-pyrrolidino-ethane and 14.8 grams of phthalic acid anhydride is heated for 1 hour to about 180° C., and the condensation product is recrystallized from alcohol. There are obtained 19.5 grams of 1-(para-phthalimido-phenoxy)-2-pyrrolidino-ethane melting at 158–159° C. The hydrochloride melts at 250–252° C.

In an analogous manner there is obtained from 1-(para-amino-phenoxy)-2-dimethylamino-ethane and phthalic acid anhydride the 1-(para-phthalimido-phenoxy)-2-dimethylamino-ethane which is directly transformed into the hydrochloride which melts at 230–231° C.

Example 4

30 grams of phthalic acid anhydride are boiled with 39 grams of the basic aniline-ether obtained by reacting the potassium salt or para-nitrophenol with 1-dimethyl-amino-2-chloro-propane and subsequent reduction of the nitro group, in 500 cc. of xylene until the separation of water is terminated. The reaction solution is evaporated under reduced pressure, the residue is taken up in alcohol and neutralized by means of alcoholic hydrochloric acid. For purification the salt which has crystallized out is dissolved in a mixture of methylene chloride and alcohol, and ether is added to the solution. In this manner 30 grams of a hydrochloride are obtained which melts at 223° C. and which corresponds to the 2-(para-phthal-imido-phenoxy)-1-dimethyl-amino-propane or to the 1-(para-phthalimido-phenoxy)-2-dimethylamino-propane.

Example 5

A mixture of 22.2 grams of phthalic acid anhydride and 35.1 grams of 1-(para-amino-phenoxy)-3-piperidino-propane is heated for 20 minutes to 180° C. The crude 1-(para-phthal-imido-phenoxy)-3-piperidino-propane thus obtained is directly transformed into the succinate which melts at 155° C. after having been agglomerated in advance.

Example 6

19.8 grams of naphthalic acid anhydride are heated with 22 grams of 1-(para-amino-phenoxy)-2-piperidino-ethane in a bath of 180–200° C. until the separation of water is completely terminated. There is obtained the 1-(para-naphthalimido-phenoxy)-2-piperidino-ethane which can be transformed without further purification into the hydrochloride which melts at 275–278° C.

Example 7

A solution of 22 grams of 1-(para-amino-phenoxy)-2-piperidino-ethane in 100 cc. of acetone is added to a solution of 14.8 grams of phthalic acid anhydride in 400 cc. of acetone. From the solution mixture obtained there crystallizes out after weak spontaneous heating the N-[4-(β-piperidino-ethoxy)-phenyl]-phthalamido-acid. It is still heated for 30 minutes under reflux, the product is sucked off and washed with acetone. The yield amounts to 34 grams; the product melts at 184–186° C. (depending upon the velocity of heating).

Upon melting the N-[4-(β-piperidino-ethoxy)-phenyl]-phthalamido-acid is completely transformed into the 1-(para-phthalimido-phenoxy)-2-piperidino-ethane described in Example 1. This transformation likewise occurs, although more slowly, at a temperature below the melting point.

When phthalamido-acid is treated with methanolic hydrochloric acid, there is likewise obtained the hydrochloride of 1-(para-phthalimido-phenoxy)-2-piperidino-ethane likewise described in Example 1 which melts at 255–257° C.

*Example 8*

53.8 grams of 1-(para-amino-phenoxy)-2-(methyl-cyclohexylamino)-ethane-hydrochloride are heated to boiling for 30 minutes under reflux with 29.6 grams of phthalic acid anhydride in 200 cc. of acetic acid. The reaction solution is evaporated under reduced pressure and the residue is recrystallized from alcohol. There are obtained 71 grams of 1-(para-phthalimido-phenoxy)-2-(methyl-cyclohexylamino)-ethane-hydrochloride which melts at 254° C.

*Example 9*

18 grams of 1-(para-amino-phenoxy)-2-cyclohexylamino-ethane-hydrochloride are heated for 30 minutes under reflux with 10 grams of phthalic acid anhydride in 70 cc. of glacial acetic acid. The hot reaction solution is filtered off with suction in the presence of char coal and the 1-(para-phthal-imido-phenoxy)-2-cyclohexylamino-ethane-hydrochloride crystallizes (22.5 grams). After recrystallization from methanol it melts at 278° C.

*Example 10*

21.7 grams of 1-(para-amino-phenoxy)-2-n-butylamino-ethane hydrochloride are heated to boiling for 35 minutes under reflux with 13.3 grams of phthalic acid anhydride in 100 cc. of glacial acetic acid and the hot reaction solution is filtered off with suction in the presence of char coal. On cooling, the 1-(para-phthalimido-phenoxy)-2-n-butylamino-ethane-hydrochloride crystallizes, it is filtered off with suction, washed with alcohol and recrystallized from glacial acetic acid. The yield amounts to 25 grams; the substance melts at 240–241° C.

*Example 11*

17.6 grams of 1-(para-amino-phenoxy)-2-dicyclohexylamino-ethane-hydrochloride and 7.6 grams of phthalic acid anhydride are boiled for 1 hour in 100 cc. of glacial acetic acid. After cooling of the reaction solution ether is added whereupon 21 grams of 1-(para-phthalimido-phenoxy)-2-dicyclohexylamino-ethane-hydrochloride crystallize out. After recrystallization from ethanol the substance melts at 252–254° C.

*Example 12*

10 grams of 1-(para-amino-phenoxy)-2-diisobutyl-amino-ethane-hydrochloride and 4.9 grams of phthalic acid anhydride are heated to boiling for 1 hour in 100 cc. of glacial acetic acid. The glacial acetic acid is then distilled off in the water jet vacuum, the residue is dissolved in isopropanol and ether is added. After inoculation the 1-(para-phthal-imido-phenoxy)-2-diisobutyl-aminoethane-hydrochloride crystallizes which after recrystallization from isopropanol melts at 190–191° C. The yield amounts to 10.8 grams.

We claim:

1. A member of the group consisting of aromatic dicarboxylic acid imides of the formula

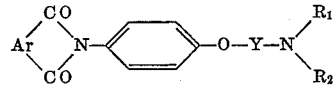

in which Ar is a member of the group consisting of unsubstituted and mono-halo substituted divalent phenyl and naphthyl groups, Y represents an alkylene group containing up to four carbon atoms, inclusive, $R_1$ is a member of the group consisting of hydrogen, alkyl groups containing up to four carbon atoms, inclusive, and cycloalkyl groups containing up to six carbon atoms, inclusive, $R_2$ is a member of the group consisting of alkyl groups containing up to four carbon atoms, inclusive, and cycloalkyl groups containing up to six carbon atoms, inclusive, and furthermore $R_1$ and $R_2$ together with the nitrogen atom form a member of the group consisting of the pyrrolidine, piperidine and morpholine rings, and the non-toxic acid addition salts of these compounds.

2. The compound of the formula

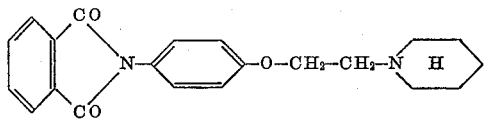

3. The compound of the formula

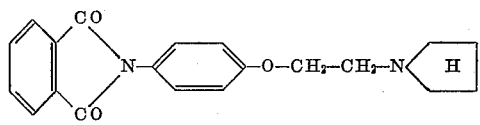

4. The compound of the formula

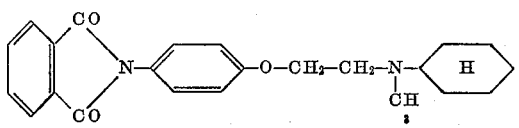

5. The compound of the formula

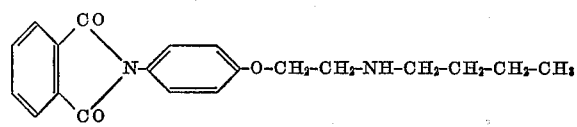

6. The compound of the formula

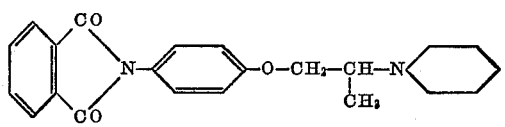

No references cited.